UNITED STATES PATENT OFFICE.

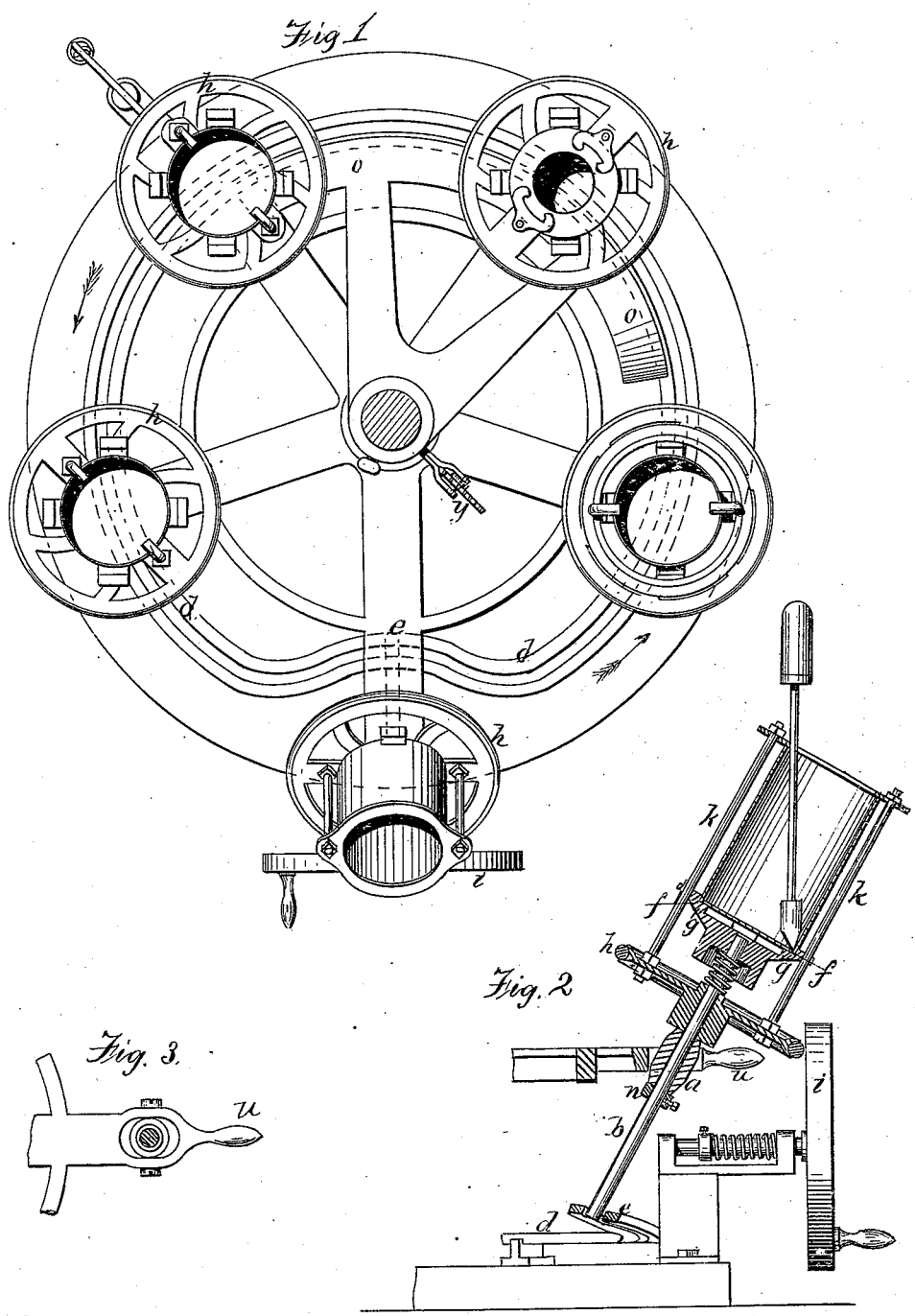

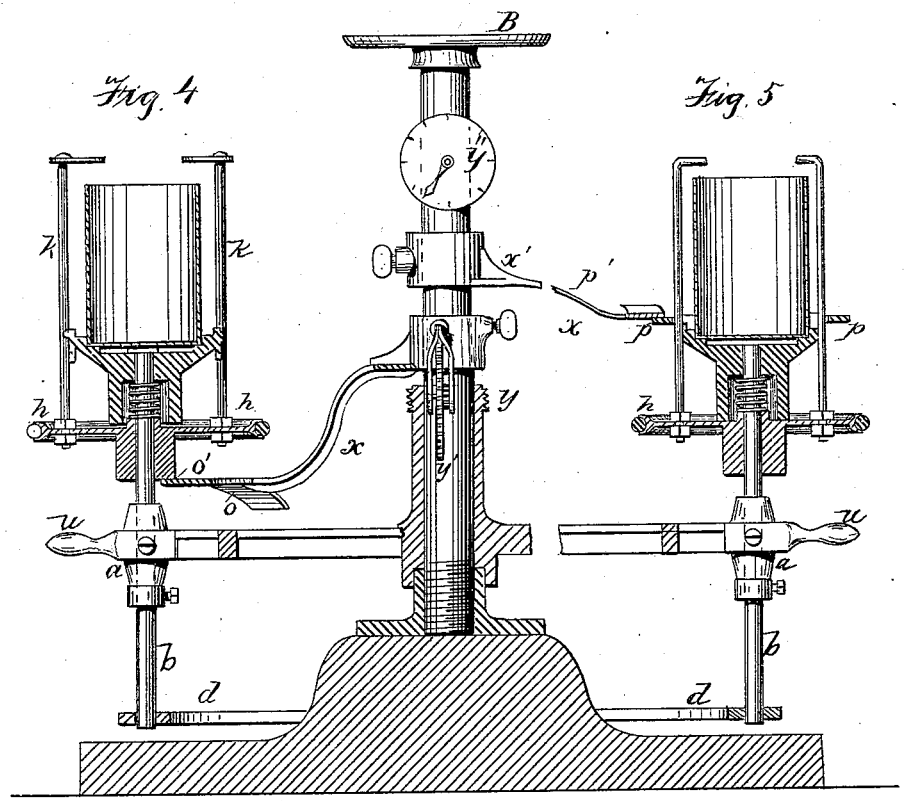
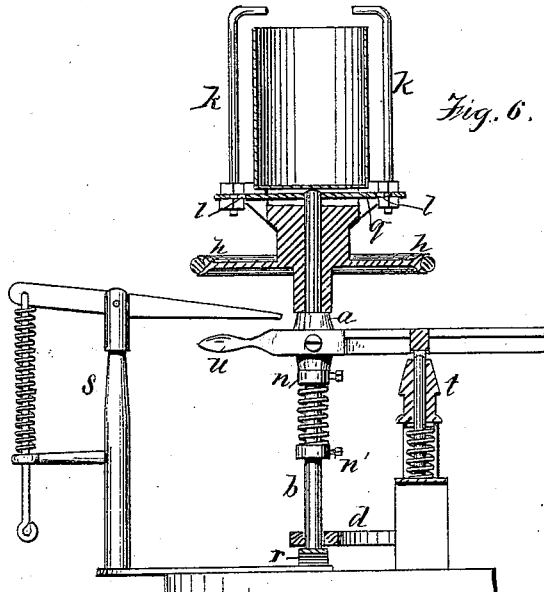

WILLIAM D. BROOKS AND RICHARD GORNALL, OF BALTIMORE, MARYLAND.

IMPROVEMENT IN SOLDERING-MACHINES.

Specification forming part of Letters Patent No. 184,755, dated November 28, 1876; application filed October 12, 1876.

*To all whom it may concern:*

Be it known that we, WILLIAM D. BROOKS and RICHARD GORNALL, of Baltimore, in the county of Baltimore, and State of Maryland, have invented a new and Improved Machine for Soldering Cans; and we do hereby declare the following to be a full, clear, and exact description of the same, reference being had to the accompanying drawings, forming part of this specification:

Our invention relates to machinery for soldering the tops and bottoms of cylindrical cans, in accordance with what is known as the floating process, and consists principally of a moving table, which carries can-holders, said holders being made to tilt from a horizontal position at one point in the movement of the table, and resume a horizontal position, in the other part of that movement. It consists, further, of details of construction, of greater or less importance, all of which I proceed to set forth fully, and to point out particularly.

Prior to our invention the only successful method of soldering the tops and bottoms of cylindrical cans from the inside, so far as we are aware, has been wholly or mainly by hand. After the side of the cylindrical part is seamed, and the tops and bottoms formed, the workman, in order to solder them in place holds the can in the left hand, between the fingers and thumb, on the edge of a flat cast-iron plate, and at angle of about forty-five degrees. This inclination is given the can in order to bring the solder in one mass, at the seam, and under the action of the iron. In the meantime the can must be rotated in order that the melted solder may move around through the entire circumference of the can, and the can must also be pressed to the plate, so that the cylinder may not spring from the top or bottom, as the case may be, by reason of the unequal heat. The difficulty of doing all this at once, and with one hand, is the cause of so many leaky cans, the parts sometimes separating in spite of the utmost care of the workman, while the can is turned to the soldering-iron. The operation is also so difficult that it requires, for rapid and successful work, experienced and skilled workmen.

It should also be added, in order that our invention and its relation to the art may be more clearly understood that, as soon as the solder, melted by the heat of the iron, and kept at the seam by the inclination of the can, is carried, by the rotation of the can, to all parts of the joint, the can must be returned immediately, and while the solder is still in fluid state, to a vertical position. This is done in order that the solder may remain uniformly distributed around the seam, and not flow to one side, and cool there, as it would if the can should be allowed to remain in an inclined position. The care and promptness required for this part of the operation also complicate the whole work, and require the greater skill and experience in the workman. The object at which we have aimed is to perform as much as possible of these operations by machinery; to hold, move, and adjust the can, so as to leave to the workman only or mainly the manipulation of the soldering-iron, and thereby make possible the employment of less skilled labor, as well as greater rapidity and certainty in the work.

In carrying out our invention we have provided a circular table, which revolves on a central standard firmly secured in any suitable fixed or movable base. This table is made with radial arms, to the outer ends of which are pivoted sleeves *a*, on axes tangent to the table, so that the said sleeves may tip outward. These sleeves are represented as pivoted in forked extremities of the radial arms, but obviously any convenient way may be adopted. Through these sleeves pass the vertical rods *b*, which sustain the can-holding mechanism, which will be described in its proper order. Directly below the sleeves *a*, when said sleeves are in vertical position, is a guideway, *d*, for the lower ends of the rods *b*. This guideway is, in the larger part of its circuit, a true circle, and, through this part, as the table revolves, the rods *b*, carried by the sleeves, are held in exactly vertical position. At that point, however, where the workman stands who performs the soldering, the guideway is curved inward, as shown at *e*. The shape of this part of the way is such that the foot of each vertical rod is carried inward until the rod is tilted to an angle of forty-five degrees, more or less. From the point of extreme deflection the way inclines, in the direction of the arrow, as the rods move, as abruptly as practicable, in order to return as promptly as possible the rods to a vertical position. This, as will be more fully explained hereinafter, brings the bottoms of the cans from an inclined to a horizontal position. While the can is in the inclined position, as shown in Fig. 2, the operation of soldering is performed in the same manner as represented above, except that the rotation is also provided for in the machine; and when the can is automatically restored to the vertical position, in the manner explained, the danger of unequal distribution of the solder is also guarded against. The mechanism for rotating the can, when in an inclined position, is shown in Fig. 2. The can rests on a base, $f$, which may be conveniently made with radial arms $g$, fixed to a hub, the said arms being inclined and provided with steps for seating different sizes of cans. These seats for the cans we have shown as fixed on the upper ends of the rods $b$. Below these seats and concentric therewith are wheels $h$, the peripheries of which, preferably covered with rubber or some like material, for frictional contact, impinge, when the rods are inclined, against a vertical wheel, $i$. This wheel is adapted to be turned by hand, or may be turned in any convenient way, and is pressed in against the edges of the wheels $h$ by a spring on its horizontal axis, which is allowed some reciprocating endwise movement for that purpose. These wheels, through the center of which the rods $b\ b$ pass, are provided with vertical rods $k\ k$, the upper ends of which are bent inward over the edge of the can, or, as an equivalent of this, are provided with a ring, or sections of a ring, to press against the upper edge of the can. These rods are threaded below, and may be adjusted in length in the wheel for different heights of can. We have also shown them as screwed into blocks $l$, in slots, as shown in Fig. 6, so as to be adjustable in and out for cans of different diameters. The hubs of the wheels $h$ rest on the sleeves. Against them, on the upper side, bear spiral springs, the other ends of which bear against the under side of the seats of the cans. As the rods $b$ slide freely in the sleeves, limited only by the rings and set-screws $n$, the effect of the spring in connection with the other parts is to force up the seat, and with it the can, until the upper end of the can bears against the inwardly-turned ends of the rods $k\ k$, or the rings thereon. The tension of the springs should be sufficient to force the parts closely and firmly together, and prevent the top or bottom from separating from the cylinder when the heat is applied.

The contact is also sufficient to hold the rings, through the rods $k\ k$, and intervening can, to the seats, so that the rotation of the wheels $h$, when in contact with the wheel $i$, shall serve to turn the cans. These clamping devices may be subject of various modifications, some of which are shown in Figs. 1, 2, 4, 5, and 6. These modifications relate, also, to devices for lifting automatically or otherwise the clamps from the cams, so that they may be removed by the attendant at another point on the rotating table. As the spring acts, except in the modification shown in Fig. 6, both to depress the wheel $h$ and to raise the seat, it is obvious that the depression of the seat, and with it the can or the elevation of the wheel $h$, will loosen the can so that it can be removed by the attendant. This can be accomplished in various ways. The most convenient we have found to be that shown at $o$ in Fig. 4. This is a camway, of any convenient length, which is located in the path of the rotating hubs of the wheels $h$, as shown clearly at $o'$. The inclined end of the cam $o$ lifts the hub of the wheel $h$, and with it the rods $k\ k$, and releases their hold on the upper end of the can. The same effect may be accomplished by providing a flange on the seat, as shown at $p$, Fig. 5, when a depression, $p'$, forces down the flange and the seat, and lowers the can from the clamps.

Another modification is shown in Fig. 6, where the seat is made solid with the wheel $h$, and is recessed to admit of a transverse bar, $q$, on the upper end of the rod $b$, which, in this instance, passes down through the hub and seat, and may turn in them, and further, is held down by a spring between the collar $n$ and another, $n'$. The release is effected in this instance by a cam, $r$, in the lower guideway, which lifts the rod $b$, and with it the bar $q$ and the rods $k\ k$. A hand or foot apparatus is also provided, as shown at $s$, Fig. 6, for the attendant to operate at will. A spring-stop, $t$, is placed under the wheel, as shown in Fig. 6, and made to drop into a notch on the under side of the wheel, when the wheel $h$ tips in its proper position opposite the attendant. It holds only enough to steady the apparatus in position; but not so much as to prevent the operator from moving the table at will. This he accomplishes by taking hold of the handles $u$.

The camway, as well as the depressor, is fixed to the central standard by arms $x\ x'$ and sleeves with set-screws.

In Figs. 1 and 4 we have shown a registering apparatus. It consists of a worm, $y$, on a sleeve fixed to the table, and gearing into a pinion, $y'$, on the standard, and through suitable gearing moves an index, $y''$. B represents a stand on the top of the central standard for holding the heating apparatus.

The clamping devices on the upper ends of rods $k\ k$ may be variously modified, either by turning in the ends of the rods or by fixing on their ends a ring or segments of a ring, so as to bear on the edge of the can, and leave the center free for the operation of the soldering tool.

Although we have shown a circular rotating table, it is obvious that the table may be segmental and reciprocate, or may be rectangular and move back and forth in straight lines.

The operation of the device is illustrated in respect to the soldering in Fig. 2, the position of the tool being there shown. The operator stands at the wheel $i$ and applies the soldering-tool within the can, watching the operation on the outside as he turns the wheel. When the solder has been applied he removes the tool, gives the table another movement until the stop falls into another notch, when another can is in place. The curved lower camway immediately restores the can to upright position, and then it goes on over the camway $o$, when the can is released, and the other attendant, who may be a boy, removes the soldered can and puts in place another.

We claim as our invention—

1. A machine for soldering cans, consisting of a moving table carrying can-holders, made to tip from and return to a perpendicular position, as set forth.

2. A machine for soldering cans, consisting of a moving table carrying can-holders, which tip from and return to a perpendicular position, and which automatically hold and release the cans at proper times, as set forth.

3. The revolving table, in combination with tipping can-holders and automatic clamping and releasing devices, as set forth.

4. The revolving table, tipping-rods $b\ b$, on the upper ends of which the cans are held, in combination with the guideway for the lower end of the rods, as set forth.

5. The combination of the wheels $h\ h$, connected to the devices which hold the cans, and tipping to come into contact with the wheel $i$, as set forth.

6. The seat for the cans, in combination with the rods $b$, the wheels $h$, and interposed spring, and with the rods $k\ k$ rigidly attached to the wheel $h$, or to the bar $q$, as set forth.

7. The camway $o$, in combination with the rotating seat, carried by the revolving table, as set forth.

8. The sleeves $a$ pivoted in the table, in combination with the rods $b$, and can-holders, as set forth.

9. The stand B on the top of the standard of the revolving table, as set forth.

WILLIAM D. BROOKS.
RICHARD GORNALL.

Witnesses:
FRANK McKENNY,
M. CHURCH.